United States Patent [19]
Zondler

[11] 3,945,953
[45] Mar. 23, 1976

[54] ω,ω'-BIS-[4-AMINO-3-AMINOMETHYL-PIPERIDYL-(1)]-ALKANES, PROCESS FOR THEIR MANUFACTURE AND THEIR USE

[75] Inventor: Helmut Zondler, Allschwil, Switzerland

[73] Assignee: Ciba-Geigy Corporation, Ardsley, N.Y.

[22] Filed: Aug. 23, 1974

[21] Appl. No.: 499,937

Related U.S. Application Data
[62] Division of Ser. No. 348,797, April 6, 1973, abandoned.

[30] Foreign Application Priority Data
Apr. 21, 1972 Switzerland............... 5930/72

[52] U.S. Cl............. 260/2 N; 260/9; 260/13; 260/18 EP; 260/28 P; 260/30.6 R; 260/31.8 E; 260/32.8 EP; 260/33.2 EP; 260/33.4 EP; 260/33.6 EP; 260/37 EP; 260/47 EN; 260/59 EP; 260/824 R; 260/836; 260/837 R
[51] Int. Cl.²............................ C08G 59/50
[58] Field of Search............ 260/2 N, 47 EN, 59 EP

[56] References Cited
UNITED STATES PATENTS
3,717,593  2/1973  Zondler et al. ............ 260/2 N
3,718,610  2/1973  Zondler et al. ............ 260/2 N FOREIGN PATENTS OR APPLICATIONS
1,032,920  6/1958  Germany

*Primary Examiner*—Donald E. Czaja
*Assistant Examiner*—E. A. Nielsen
*Attorney, Agent, or Firm*—Vincent J. Cavalieri

[57]  ABSTRACT

ω,ω'-bis-[4-amino-3-aminomethyl-piperidyl-(1)]-alkanes of the general formula

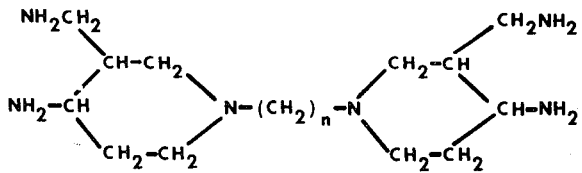

wherein $n$ is a number from 2 to 6, are prepared by hydrogenating, a ω,ω'-bis-[4-amino-3-cyano-1,2,5,6-tetrahydro-pyridyl-(1)]-alkane at temperatures from 20° to 280°C. These polyamines are valuable hardeners for epoxide resins. They are also of interest as intermediates for organic syntheses.

9 Claims, No Drawings

ω,ω'-BIS-[4-AMINO-3-AMINOMETHYL-PIPERIDYL-(1)]-ALKANES, PROCESS FOR THEIR MANUFACTURE AND THEIR USE

This is a Division of application Ser. No. 348,797, filed on Apr. 6, 1973, now abandoned.

The present invention provides new ω,ω'-bis-[4-amino-3-aminomethyl-piperidyl-(1)]-alkanes of the general formula

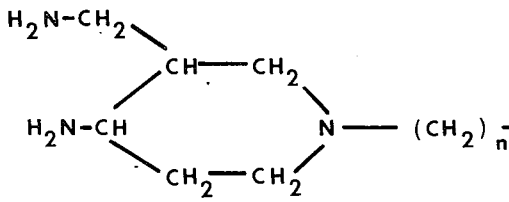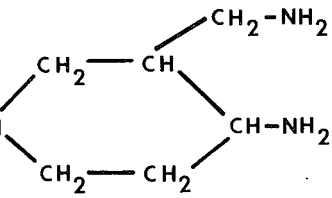

(I)

wherein n represents a number from 2 to 6. The following new substances are concerned, depending on which particular number n represents: ω,ω'-bis-[4-amino-3-aminomethyl-piperidyl-(1)]-ethane, -propane, -butane, -pentane and hexane.

The ω,ω'bis-[4-amino-3-aminomethyl-piperidyl-(1)]-alkanes of the formula I are manufactured according to the invention by hydrogenating a ω,ω'-bis-[4-amino-3-cyano-1,2,5,6-tetrahydropyridyl-(1)]-alkane of the general formula

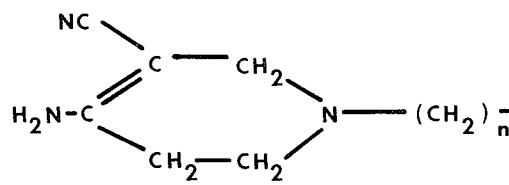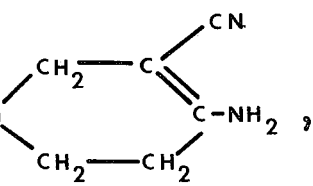

(II)

at temperatures of 20° to 280°C. A hydrogenation at temperatures between about 150° and 250°C constitutes a preferred embodiment of the invention.

The hydrogenation takes place in the presence of a catalyst. Raney nickel or Raney cobalt are particularly effective hydrogenation catalysts. It is also possible to use a cobalt trioxide catalyst on a suitable carrier which is reduced in a flow of hydrogen to a cobalt metal catalyst.

Suitable hydrogenation catalysts are also catalysts on the basis of platinum or palladium, which can be used as colloidal platinum or palladium, or as platinum or palladium oxide or hydroxide catalysts. Suitable carriers for such catalysts are the customary materials such as asbestos, pumice, diatomaceous earth, silica gel, silicic acid, activated charcoal, the sulphates, carbonates or oxides of the metals of the IInd. to VIIIth. group of the Periodic System, in particular of magnesium, calcium, barium, zinc, aluminium, iron, chromium, and zirconium.

Preferably, very finely divided nickel or cobalt (Raney nickel or Raney cobalt) or Raney nickel with a small content of palladium is used.

The hydrogenation can be carried out by the conventional methods used in the laboratory and in industry both without pressure, e.g. in a vibrating apparatus, or under pressure in an autoclave.

As solvents in the hydrogenation it is possible to use the organic solvents which are customarily used with the above cited catalyst types, in particular alcohols or ethers, such as methanol, ethanol, dioxan. The presence of gaseous ammonia during nitrile hydrogenation produces a favourable result.

As a rule, the catalytic reduction is carried out by mixing the suspension or solution of the respective ω,ω'-bis-[4-amino-3-cyano-1,2,5,6-tetrahydropyridyl-(1)]-alkane with the catalyst and passing hydrogen gas into the reaction mixture. In principle, the hydrogenation can be carried out at atmospheric pressure, but elevated pressures of 50 atmospheres and over are preferred. The hydrogenation is continued until no more hydrogen is absorbed. Upon completion of the hydrogenation, the catalyst is isolated e.g. by filtration and the solvent is distilled off.

It is also possible to carry out the hydrogenation by other known methods, for example by treatment with alkali metals, such as metallic sodium, dissolved in alcohol.

The following ω,ω'-bis[4-amino-3-cyano-1,2,5,6-tetrahydro-pyridyl-(1)]-alkanes of the formula II are suitable starting materials for the process according to the invention: ω,ω'-bis-[amino-3-cyano-1,2,5,6-tetrahydropyridyl-(1)]-ethane, propane, -butane, -pentane and -hexane.

The ω,ω'-bis-[4-amino-3-cyano-1,2,5,6-tetrahydropyridyl-(1)]-alkanes of the formula II can be manufactured in accordance with the description of German Offenlegungsschrift 1 445 734 (page 3) by cyclisation of N,N,N',N'-tetrakiscyanoethyl-alkylenediamines. The diamines just mentioned which contain 4 cyanoethyl radicals are also known and their manufacture is described for example in U.S. Pat. No. 3.020.310 (Example IV).

The ω,ω'-bis-[4-amino-3-aminomethyl-piperidyl-(1)]-alkanes of the formula I according to the invention are valuable hardeners for epoxide resins. Compared with known hardeners for epoxide resins, the substances according to the invention possess the advantage that ultimately plastics are obtained with superior dimensional stability under heat. Moreover, the hardeners according to the invention are to be viewed very favourably with respect to toxicity.

The present invention therefore also provides curable mixtures which are suitable for the manufacture of moulded articles, impregnations, coatings, and bonds, which contain a. one polyepoxide compound with on average more than one epoxide group in the molecule, and b. a ω,ω'-bis-[4-amino-3-aminomethyl-piperidyl-(1)]-alkane of the formula I as hardener.

For each equivalent of epoxide groups of the polyepoxide compound (a) it is practical to use 0.5 1.3 equivalents, preferably about 1 equivalent, of active hydrogen atoms bonded to nitrogen of the ω,ω'-bis[4-amino-3-amino-methylpiperidyl-(1)]-alkane of the formula I.

Suitable polyepoxide compounds (a) are chiefly those which contain on average more than one glycidyl, β-methylglycidyl, or 2,3-epoxycyclopentyl group bonded to a heteroatom (e.g. sulphur, preferably oxygen or nitrogen). In particular there may be mentioned: bis-(2,3-epoxycyclopentyl) ether; di- or polyglycidyl ethers of polyhydric aliphatic alcohols, such as 1,4-butane diol, or polyalkylene glycols, such as polypropylene glycols; di- or polyglycidyl ethers of cycloaliphatic polyols, such as 2,2-bis-(4-hydroxycyclohexyl)-propane; di- or polyglycidyl ethers of polyvalent phenols, such as resorcinol, bis-(p-hydroxyphenyl)methane, 2,2-bis-(p-hydroxyphenyl)-propane (=diomethane), 2,2-bis(4'-hydroxy-3',5'-dibromophenyl)propane, 1,1,2,2-tetrakis-(p-hydroxyphenol)-ethane, or of condensation products of phenols with formaldehyde which are obtained under acid conditions, such as phenol-novolaks and cresol-novolaks; di- or poly-(β-methylglycidyl)ethers of the above cited polyhydric alcohols or polyvalent phenols; N-glycidyl derivatives of amines, amides, and heterocyclic nitrogen bases, such as N,N-diglycidyl-aniline, N,N-diglycidyl toluidine, N,N,N',N'-tetraglycidyl-bis(p-aminophenyl)-methane; triglycidyl isocyanurate; N,N'-diglycidylethylene urea; N,N'-diglycidyl-5,5-dimethyl hydantoin, N,N'diglycidyl-5-isopropyl-hydantoin; N,N'-diglycidyl-5,5-dimethyl-6-isopropyl-5,6-dihydro-uracil.

If desired, the viscosity can be lowered by adding to the polyepoxides active diluents, for example styrene oxide, butylglycidyl ether, isooctylglycidyl ether, phenylglycidyl ether, cresylglycidyl ether, glycidyl esters of synthetic, highly branched, principally tertiary aliphatic monocarboxylic acids (CARDURA E).

The curing of the hardenable mixtures to give moulded articles and the like is carried out advantageously in the temperature range from 20°C to 160°C. It is possible to carry out the curing in known manner in two or more steps, the first curing step being carried out at low temperature and the post cure at more elevated temperature.

If desired, the curing can also be carried out in 2 steps in such a way that the curing reaction is initially discontinued prematurely, or the first step is carried out at room temperature or only slightly elevated temperature, in the process of which a still fusible and soluble, curable precondensate (so-called "B-step") is obtained from the epoxide component (a) and the amine hardener (b). Such a precondensate can be used for example for the manufacture of pre-pregs, moulding compositions or, in particular, sinter powders.

To shorten the gel and curing times it is possible to add known accelerators for the amine curing, e.g. mono- or polyphenols, such as phenol or diomethane, salicyclic acid, tertiary amines, or salts of thiocyanic acid, such as NH$_4$SCN.

The term "curing" as used herein means the conversion of the soluble, either liquid or frusible polyepoxides into solid, insoluble and infusible, three dimensional crossed-linked products or materials, as a rule accompanied by simultaneous forming to moulded articles, such as castings, moulded articles, laminates and the like, or to sheet or film-like structures, such as coatings, films of lacquer, or bonds.

The curable mixtures from polyepoxide compounds (a) and ω,ω'-bis-[4-amino-3-aminomethyl-piperidyl-(1)]alkanes of the formula I as hardeners can further be treated before the curing at any phase with conventional modifiers, such as extenders, fillers and reinforcing agents, pigments, dyes, organic solvents, plasticisers, flow control agents, thixotropic agents, flame retardant materials, and mould release agents.

As examples of extenders, reinforcing agents, fillers, and pigments which can be used in the curable mixtures according to the invention there may be cited: bituminous coal tar, bitumen, textile fibres, glass fibres, asbestos fibres, boron fibres, carbon fibres, cellulose, polyethylene powder, polypropylene powder, quartz powder, mineral silicates, such as mica, asbestos powder, powdered slate, China clay, aluminium oxide trihydrate, powdered chalk, gypsum, antimony trioxide, bentonite, silicic acid aerogel (AEROSIL), lithopone, barites, titanium dioxide, carbon black, graphite, oxide colours, such as iron oxide, or metal powders, such as aluminium or iron powder.

Examples of suitable solvents for the modification of the curable mixtures are toluene, xylene, n-propanol, butyl acetate, acetone, methyl ethyl ketone, diacetone alcohol, ethylene glycol monomethyl, monoethyl, and monobutyl ether.

Examples of plasticisers which can be used for the modification of the curable mixtures are dibutyl, dioctyl and dinonyl phthalate, tricresyl phosphonate, trixylenyl phosphate, also polypropylene glycols.

As flow control agents in using the curable mixtures particularly in surface protection it is possible to add e.g. silicones, cellulose acetobutyrate, polyvinyl butyral, waxes, stearates etc. (which to some extent can also be used as mould release agents).

Particularly for application in the paint and varnish field, the polyepoxide compounds can be partially esterified in known manner with carboxylic acids, in particular higher unsaturated fatty acids. It is further possible to add other curable synthetic resins, e.g. phenolic plastics or aminoplasts, to such coating resin formulations.

The manufacture of the curable mixtures according to the invention can be effected in the conventional manner with the aid of known mixing devices (stirrers, kneaders, roll mills etc.).

The curable epoxide resin mixtures according to the invention find application primarily in the fields of electrical engineering, laminating, and in the building trade. In a formulation adapted to the respective particular purpose they can be used in the unfilled or filled state, optionally in the form of solutions or emulsions, as paints, lacquers, sinter powders, moulding compositions, injection moulding formulations, dipping resins, casting resins, impregnating resins, binders and adhesives, as mould resins, laminating resins, sealing compounds and fillers, floor covering compositions, and binders for mineral aggregates.

The following epoxide resins were used for the manufacture of curable mixtures described in the Examples:

Epoxide resin A

Polyglycidyl ether resin (industrial product), liquid at room temperature, manufactured by condensation of diomethane (2,2-bis(p-hydroxyphenyl)-propane) with a stoichiometric excess of epichlorohydrin in the presence of alkali, and consisting in the main of diomethane diglycidyl ether of the formula

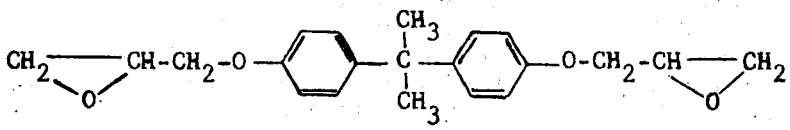

and with the following constants:

epoxide content: 5.1 – 5.5 epoxide equivalents/kg. viscosity (Hoeppler) at 25°C: 9000 – 13,000 cP.

Epoxide resin B

Diglycidyl ether resin (industrial resin), liquid at room temperature, manufactured by condensation of hydrogenated diomethane (2,2-bis(p-hydroxycyclohexyl)-propane) with a stoichiometric express of epichlorohydrin in the presence of alkyli, and consisting in the main of hydrogenated diomethane diglycidyl ether of the formula

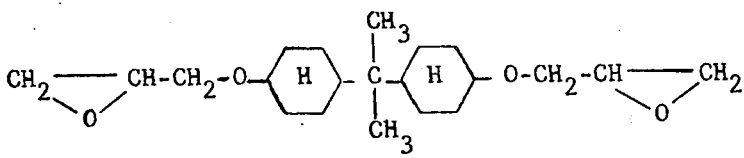

and with an epoxide content of 4.46 epoxide equivalents/kg.

A. Manufacturing Examples

EXAMPLE 1 a.

1,2-bis-[4-amino-3-cyano-1,2,5,6-tetrahydro-pyridyl-(1)]-ethane

To a solution of 10 g of sodium in 2000 ml of tert. butanol are added 1027 g of N,N'-tetracyanoethylethylenediamine and the emulsion is then kept under reflux for 10 hours with stirring. The solid product is filtered off with suction after cooling. The filtrate is boiled once more with 1500 ml of ethanol and after filtering with suction, washing and drying for 12 hours at 100°C in vacuo there are obtained 943 g (91.8%) of crude product, which sinters from 230°C. The product is further purified by stirring it for 2 hours in 1500 ml of water, filtering with suction and drying in vacuo at 100°C. Yield: 882 g (85.8% of theory); melting point 250°C.

The analysis was effected by recrystallising 150 mg from 10 ml of cyclohexanone, washing the crystals with ethanol and drying them in vacuo at 120°C for 12 hours.

Yield: 90 mg; m.p. 254°C. Analysis: $C_{14}H_{20}N_6$ (M = 272.36). calculated: C 61.74 H 7.40. found: C 62.10 H 7.43.

The mass spectrum shows the molecular peak at m/e 272 and the primary fragment at m/e 136.

b.

1,2-bis-[4-amino-3-aminomethyl-piperidyl-(1)]-ethane (curer K)

In the presence of 50 g of Raney nickel, 680 g of the product obtained according to Example 1a are hydrogenated in an autoclave in 2500 ml of ethanol and 600 g of gaseous ammonia at 170°–175°C and an initial pressure of 100 atmospheres absolute pressure over the course of 10 hours. The catalyst is filtered off with suction, the filtrate is concentrated in a rotary evaporator, and volatile constituents are removed at an oil bath temperature of 100°C and a pressure of 0.2 mm Hg, to leave as residue 641 g of crude amine in the form of a brown, viscous substance.

A sample for analysis (pure amine) was obtained by fractional distillation over a short packed column.

Boiling point: 186°–190°C at 0.03 mm Hg. Analysis: $C_{14}H_{28}N_6$ (M = 284.44). calculated: C 59.11 H 11.34. found: C 59.23 H 11.41.

EXAMPLE 2 a.

1,6-bis-[4-amino-3-cyano-1,2,5,6-tetrahydro-pyridyl-(1)]-hexane

To a solution of 500 mg of sodium in 100 ml of tert. butanol are added 27.6 g of N,N'-tetracyanoethyl-hexamethylenediamine and the emulsion is boiled for 30 minutes under reflux. After cooling, the solid product is filtered off with suction, washed with ethanol and dried at 60°C in vacuo. Yield: 23.1 g (83.7%); melting point 179°–181°C.

The product was analysed by recrystallising 1.6 g from 25 ml of chlorobenzene and drying the crystals for 12 hours in vacuo at 100°C.

Yield: 0.82 g melting at 179°–181°C. Analysis: $C_{18}H_{28}N_6$ (M = 328.45). calculated: C 65.82 H 8.59 N 25.59. found: C 65.68 H 8.39 N 25.00.

The IR spectrum shows absorption at 3410, 3320 cm$^{-1}$(NH$_2$); 2160 cm$^{-1}$(conjugated CN); 1680 cm$^{-1}$(C=C); 1615 cm$^{-1}$(NH$_2$).

b.

1,6-bis-[4-amino-3-aminomethyl-piperidyl-(1)]-hexane (hardener L)

In the presence of 25 g of Raney nickel, 349 g of the product obtained according to Example 2a are hydrogenated in 800 ml of ethanol and 200 g of gaseous ammonia at 170°–175°C and an initial pressure of 100 atmospheres absolute pressure. The catalyst is filtered off with suction, the filtrate concentrated in a rotary evaporator, and volatile constituents are removed at an oil bath temperature of 100°C and a pressure of 0.2 mm Hg, to leave as residue 305.5 g (84.3%) of dark crude amine which cannot be purified by distillation.

B. Application Examples

The test specimens were manufactured by mixing the hardeners (amines) with the corresponding epoxides in the equivalent ration 1:1, gassing the mixtures briefly in vacuo, and then casting them to sheets measuring 200 × 200 × 4 mm. The curing was carried initially for 4 hours at 80°C and subsequently for 12 hours at 140°C.

The superiority of the thermomechanical properties of the resins obtained with, in particular, bisphenol-A-diglycidyl ether as epoxide component compared with those which were manufactured by using ordinary commercially obtainable amines such as ethylene diamine, isophorondiamine and the somewhat toxic bis-(p-aminophenyl)-methane, is apparent from the Table. The compositions of the curable mixtures and the respective values of the dimensional stability under heat (DIN 53461) are indicated in this Table.

TABLE

| Example | Epoxide resin | | Hardener | | Dimensional stability under heat |
|---|---|---|---|---|---|
| | Type | Parts by weight | Type | Parts by weight | |
| I | A | 112 | K (pure amine) | 20,7 | 165°C |
| II | A | 140 | K (crude amine) | 25,9 | 161°C |
| III | B | 150 | K (pure amine) | 23,7 | 100°C |
| IV | A | 135 | L (crude amine) | 30,0 | 148°C |
| V | B | 150 | K (crude) | 23,7 | 100°C |
| Comparative Example | | | | | |
| VI | A | 150 | ethylendiamine | 11,8 | 117°C |
| VII | A | 135 | isophorondiamine | 30,0 | 105°C |
| VIII | A | 130 | bis-(p-aminophenyl)-methane | 33,7 | 152°C |
| IX | B | 165 | ethylendiamine | 11,0 | 63°C |
| X | B | 145 | isophorondiamine | 27,4 | 93°C |
| XI | B | 140 | bis-(p-aminophenyl)-methane | 30,8 | 98°C |

I claim:
1. A curable mixture which is suitable for the manufacture of moulded articles, impregnations, coatings and bonds, which contains
   a. one polyepoxide compound with on average more than one 1,2-epoxide group in the molecule, and
   b. as hardener a ω,ω'-bis[4-amino-3-aminomethyl-piperidyl-(1)]-alkane of the general formula

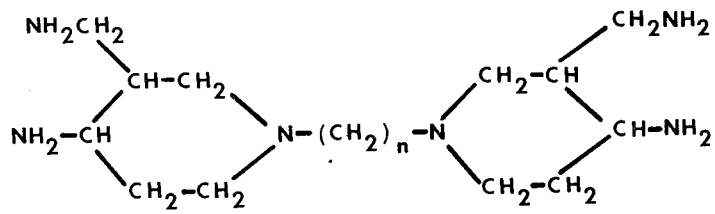

wherein n is a number from 2 to 6.
2. A mixture according to claim 1, which contains for each equivalent of 1,2 epoxide groups of the polyepoxide compound (a) 0.5 to 1.3 equivalents, preferably about 1 equivalent, of active hydrogen atoms bonded to nitrogen of the respective ω,ω'-bis-[4-amino-3-aminomethyl-piperidyl)-(1)]-alkane (b).

3. A mixture according to claim 1, which contains one polyepoxide compound (a) with on average more than one glycidyl, β-methylglycidyl or 2,3-epoxy-cyclopentyl group bonded to a heteroatom, in the molecule.

4. A mixture according to claim 1, which contains as polyepoxide compound (a) a polyglycidyl ether of a cycloaliphatic polyol.

5. Mixtures according to claim 4, which contain as polyepoxide compound the diglycidyl ether of 2,2-bis-(4'-hydroxycyclohexyl)-propane.

6. A mixture according to claim 1, which contains as polyepoxide compound (a) a polyglycidyl ether of a polyvalent phenol.

7. A mixture according to claim 6, which contains as polyepoxide compound (a) a polyglycidyl ether of 2,2-bis-(p-hydroxyphenyl)-propane.

8. A mixture according to claim 1, which contains as polyepoxide compound a N-glycidyl derivative of a heterocyclic nitrogen base.

9. A process for the manufacture of cured moulded articles, wherein a curable mixture according to claim 2 is cured at temperatures from 20°C to 160°C and moulded.

* * * * *